W. H. BARBER, dec'd.

J. E. BARBER, Administrator.

DEVICE FOR HOLDING BITS AND OTHER TOOLS.

No. 7,263. Reissued Aug. 15, 1876.

Witnesses.

H. N. Gale

Henry A. Mitchell

Inventor.

William Henry Barber, dec'd.
J. E. Barber, Adm'r,
Assignee

Millers Falls Company

By James Shepard Att'y.

N. PETERS, PHOTO-LITHOGRAPHER, WASHINGTON, D. C.

UNITED STATES PATENT OFFICE.

MILLER'S FALLS COMPANY, OF MILLER'S FALLS, MASSACHUSETTS, ASSIGNEE BY MESNE ASSIGNMENTS, OF J. ERNEST BARBER, ADMINISTRATOR OF WILLIAM H. BARBER, DECEASED.

IMPROVEMENT IN DEVICES FOR HOLDING BITS AND OTHER TOOLS.

Specification forming part of Letters Patent No. 42,827, dated May 24, 1864; reissue No. 4,736, dated February 6, 1872; reissue No. 7,263, dated August 15, 1876; application filed April 19, 1876.

*To all whom it may concern:*

Be it known that WILLIAM HENRY BARBER, late of Greenfield, in the county of Franklin and State of Massachusetts, invented certain new and useful Improvements in Devices for Holding Bits and other Tools without Fitting the Same to the Holder, and of which the following is a specification:

This invention relates to instruments for holding bits and analogous tools in the condition in which they are usually purchased, and without any previous fitting to the instrument or holder; and it consists in the novel parts and combinations of parts, as hereinafter fully set forth.

Figure 1:
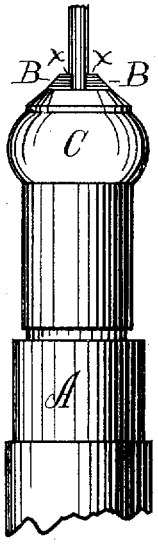
Figure 2:
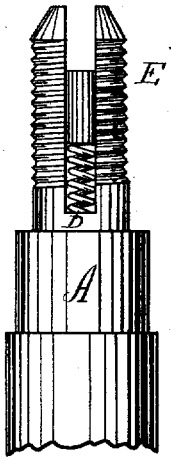
Figure 3:
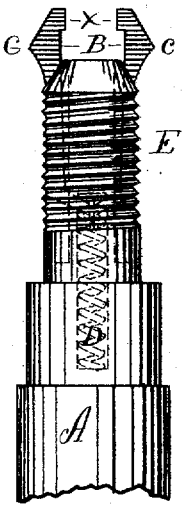
Figure 4:
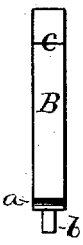
Figure 5:
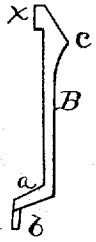
Figure 6:
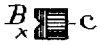
Figure 7:
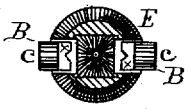
Figure 8:
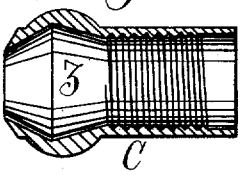
Figure 9:
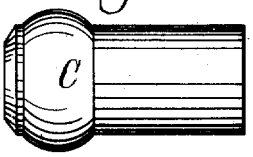

Figure 1 shows the holder with the jaws closed upon the tool, ready for use. Fig. 2 shows the threaded center-piece and socket designed to receive a revolving sleeve-nut. Fig. 3 shows the jaws and center-piece. Figs. 4 and 5 show the jaws detached. Figs. 6 and 7 show the ends of the jaws, the latter figure also showing the rectangular tapering bore in the socket. Fig. 8 shows the sleeve-nut in section, and Fig. 9 shows the same in side elevation.

The instrument or holder consists of a central piece, A, threaded externally, and provided with a rectangular tapering bore, thus forming a socket to receive the shank of the bit or other analogous tool. A sleeve-nut, C, is made to fit the screw-thread upon the periphery of the central piece A, and acts to close the jaws upon the tool. The central piece A is bored below the socket to receive a helical spring, D, for the purpose of opening the jaws. The jaws B B are constructed with projections *c* upon their outer sides near their upper ends, and with their lower ends terminating in the angle *a* and short tang *b*. The projections *c c* form summits, from which the exterior faces of the jaws are inclined toward both ends. The upper ends of the jaws, upon their confronting faces and opposite the projections *c c*, are excavated, in order to make room for the shoulders of the bit-shank, the griping ends or projections *x x* taking hold upon the stem of the bit below the shank.

The position of the jaws, when they are about to gripe upon a bit or other tool, is shown in Fig. 3. The upper ends of the jaws may be nicked, as shown in Fig. 7, so as to grasp tightly and partially encircle the stem of a bit. The tangs *b b* of the jaws are inserted within and compressed by the spring D, as plainly indicated.

It is of great importance that these jaws should work in slots, because they are thereby kept in proper position laterally, while moving forward and backward to gripe and release the tool.

The sleeve-nut C is threaded a portion of its length to correspond with the thread of the center-piece or socket, and above the threaded portion its internal diameter is enlarged into a chamber, Z, (see Fig. 8,) in the vicinity of the projections *c c* of the jaws, to allow sufficient range of movement of the jaws to enable them to receive the largest part of the bit-shank between and below the griping ends or projections of the jaws.

The operation of this instrument is as follows: The sleeve-nut C is screwed upward upon the socket or center-piece until the jaws separate, as shown in Fig. 3, and the shank of a tool being then inserted in the rectangular tapering bore below and between the griping ends or projections *x x* of the jaws, the sleeve-nut is screwed down, thereby closing the jaws and moving them longitudinally in the direction of the movement of the sleeve-nut. The jaws are thereby firmly griped upon the tool, and also made to fasten the shank firmly in the rectangular bore of the socket.

It is of great advantage in an instrument of this kind to have the jaws automatically opened, and this is effected by the spring D. When the jaws, occupying the position shown in Fig. 3, are forced together so that their upper ends approach each other, as seen in Fig. 1, their lower ends will form a fulcrum in the socket E, and the tangs will be forced apart against the sides of the spring which surrounds them, so that when the upper ends of the jaws are released by unscrewing the sleeve-nut, the springs will act upon the tangs, to cause them to approach each other and open the jaws at their upper ends, where the tool is inserted.

We are aware that jaws tapering upon their outer surface, and made to close by a tapering nut, have been used in awl-holders, an example of which may be seen in the patent granted Dexter H. Chamberlain, February 7, 1854, for an awl-holder, and such a device is therefore disclaimed. We are also aware that a split or slotted gripe screwing into a nut in an awl-handle has been used, and that the grasping parts of said mandrel would open slightly by reason of their inherent elasticity, an example of which may be seen in the patent granted to Dexter H. Chamberlain, May 20, 1848, and we therefore disclaim such a device; but we are not aware that a socket having a rectangular tapering bore to receive the shank of a bit has ever before been used in combination with a sleeve-nut inclosing the jaws, and moving in the direction of the tool-handle to close and center them, or that jaws provided with projections *c* and *x*, or a sleeve-nut having an enlarged internal chamber, have been used either separately or in combination with each other, to meet the requirements of a tool having the peculiar shank of a marketable bit.

What therefore is claimed as the improvement of WILLIAM HENRY BARBER, in instruments for holding bits and analogous tools, is—

1. The jaws B B, constructed substantially as and for the purposes specified.

2. The enlarged chamber Z, in combination with jaws having projections *c* and *x*, substantially as and for the purpose specified.

3. The threaded socket provided with a rectangular tapering bore, in combination with a chambered sleeve-nut, and jaws having projections *c* and *x*, substantially as and for the purpose specified.

4. The combination of a threaded socket, having a rectangular tapering bore, a sleeve-nut acting in the direction of the handle, and companion jaws working in slots which prevent lateral displacement, said parts co-operating to grasp and center the bit, and also fasten the shank firmly in the tapering bore, the jaws taking hold upon the stem of the bit below its shank, substantially as described.

5. In combination with the loose companion jaws of a bit-holder, a spring applied at their non-grasping ends to automatically open the jaws, substantially as described.

MILLER'S FALLS COMPANY,

By HENRY L. PRATT, *President.*

Witnesses:

EDWARD P. STOUGHTON,

JAMES SHEPARD.